(12) United States Patent
Han et al.

(10) Patent No.: US 7,009,988 B2
(45) Date of Patent: Mar. 7, 2006

(54) ADAPTIVE BUFFER PARTITIONING METHOD FOR SHARED BUFFER SWITCH AND SWITCH THEREFOR

(75) Inventors: Man-soo Han, Daejon (KR); Yool Kwon, Daejon (KR); Hong-soon Nam, Daejon (KR); Woo-seop Rhee, Daejon (KR)

(73) Assignee: Electronics and Telecommunications Research Institute, (KR)

( * ) Notice: Subject to any disclaimer, the term of this patent is extended or adjusted under 35 U.S.C. 154(b) by 742 days.

(21) Appl. No.: 10/055,454

(22) Filed: Jan. 22, 2002

(65) Prior Publication Data

US 2003/0135579 A1    Jul. 17, 2003

(30) Foreign Application Priority Data

Dec. 13, 2001   (KR)   .............................. 2001-78954

(51) Int. Cl.
  *H04L 12/28*   (2006.01)
  *H04L 12/56*   (2006.01)
(52) U.S. Cl. ...................... 370/412; 370/429; 370/413; 370/232; 370/233; 370/234; 370/235; 370/252; 709/229; 709/234
(58) Field of Classification Search ................ 370/412, 370/235, 252, 235.1, 229, 230, 231, 232, 370/233, 234, 413, 417, 429, 371; 709/229, 709/234, 235, 213; 710/52, 53, 54, 56, 57
See application file for complete search history.

(56) References Cited

U.S. PATENT DOCUMENTS 5,457,679 A   10/1995   Eng et al. ..................... 370/16

5,528,587 A   6/1996   Galand et al. ................ 370/60

(Continued)

OTHER PUBLICATIONS

IEEE Journal, vol. 13, No. 6, Aug. 1995, "A New Approach for Allocating Buffers . . . ", A. Elwalid, D. Mitra, R. Wentworth, 13 pages.

(Continued)

*Primary Examiner*—Wellington Chin
*Assistant Examiner*—Chuong Ho
(74) *Attorney, Agent, or Firm*—Blakely Sokoloff Taylor & Zafman (57) ABSTRACT

A method for adaptively partitioning a buffer in a shared buffer switch is provided. The buffer partitioning method for a shared buffer switch which has a plurality of input ports, a plurality of output ports, and a shared buffer, the method for determining whether or not to store a cell, which is newly received through one of the input ports, in the shared buffer comprises the steps of (a) determining a buffer area of the shared buffer in which the newly received cell is stored; (b) determining a cell discard threshold with respect to the total number of cells stored in the shared buffer and the changing rate, with respect to time, of the total number of the cells; and (c) determining whether or not to store the newly received cell in the shared buffer, by comparing the number of cells stored in the buffer area in which the newly received cell is to be stored, with the cell discard threshold. In the method, using a cell discard threshold which is determined with respect to the total number of cells stored in a shared buffer and the changing rate of the total number of cells, it is determined whether or not to store a newly received cell. Therefore, the shared buffer switch adaptively handles changes in inflowing traffic volume and changes in outflowing cell traffic volume such that cell loss due to cell discard is effectively prevented.

18 Claims, 5 Drawing Sheets

U.S. PATENT DOCUMENTS

| | | | |
|---|---|---|---|
| 5,541,912 A | | 7/1996 | Choudhury et al. .......... 370/17 |
| 5,909,547 A | * | 6/1999 | Mitra ......................... 709/213 |
| 6,092,115 A | * | 7/2000 | Choudhury et al. ........ 709/235 |
| 6,456,590 B1 | * | 9/2002 | Ren et al. ................... 370/229 |
| 6,539,024 B1 | * | 3/2003 | Janoska et al. ............. 370/412 |
| 6,671,258 B1 | * | 12/2003 | Bonneau ..................... 370/235 |
| 6,690,645 B1 | * | 2/2004 | Aweya et al. ............... 370/230 |
| 6,788,697 B1 | * | 9/2004 | Aweya et al. ............... 370/412 |

OTHER PUBLICATIONS

IEEE Journal, 1997, "Traffic Shaping at a Network Node: Theory, Optimum Design, Admission Control", A. Elwalid, D. Mitra, 10 pages.

IEEE Journal, 1999, "Dynamic Partitioning: A Mechanism for Shared Memory Management", S. Krishnan, A Choudhury, F. Chiussi, 9 pages.

* cited by examiner

ADAPTIVE BUFFER PARTITIONING METHOD FOR SHARED BUFFER SWITCH AND SWITCH THEREFOR

BACKGROUND OF THE INVENTION

1. Field of the Invention

The present invention relates to a shared buffer switch, and more particularly, to a buffer partitioning method for a shared buffer switch and a shared buffer switch which is used in the method.

2. Description of the Related Art

A network which transfers data among communications apparatuses includes a plurality of switching nodes. Shared buffer switches are widely used as switching nodes. Since the size of a shared buffer is limited, unless the shared buffer is partitioned appropriately with respect to the traffic volume of inflowing cells and the operating environments, the performance of the switch will be degraded. That is, under the same hardware environments, the cell loss ratio and buffer utilization ratio will differ according to a shared buffer partitioning method.

Among prior art methods for efficiently partitioning a shared buffer, there are a virtual partitioning method, a dynamic threshold method, and a dynamic partitioning method.

The virtual partitioning method (U.S. Pat. No. 5,909,547) uses a plurality of port thresholds, each of which is allocated for an output port, and an entire buffer threshold which is assigned to the buffer. If the number of cells currently stored in a buffer for an output port is less than the port threshold of the output port, and the number of cells currently stored in the entire buffer is less than the entire buffer threshold, the state is referred to as an underload state, and if the number of cells currently stored in a buffer for an output port is greater than the port threshold of the output port, but the number of cells currently stored in the entire buffer is less than the entire buffer threshold, the state is referred to as an overload state. When a cell arrives to an output port, if the output port is in an underload or overload state, the cell is stored in the buffer, and otherwise the cell is discarded.

Since the virtual partitioning method uses a fixed threshold for each output port, it is difficult for the method to be actively adapted to the external condition changes such as backpressure. In addition, since it is difficult to predetermine thresholds for traffic whose variables cannot be specified in advance such as Unspecified Bit Rate (UBR) traffic, the method cannot be applied to such traffics. Furthermore, since the method uses only the total number of the cells as the criterion, it is difficult for the method to be swiftly adapted to traffic changes and external conditions change.

The dynamic threshold method (U.S. Pat. No. 5,541,912) divides a shared buffer into a reserved area, and available areas, each of which is assigned to an output port. In the method, if an output port has waiting cells, it is referred to as an active output port. The threshold of the active output port is a value obtained by dividing the size of the whole available area by the number of active output ports. If the number of cells currently waiting in an available area is equal to or greater than the threshold of the corresponding output port, newly arriving cells are discarded, and otherwise newly arriving cells are stored in the available area. The reserved area is provided for a buffering effect which prevents sudden changes of threshold values when an output port which was not active becomes an active port.

In the dynamic threshold method, if inflowing traffic or a service rate differs for each active output port, utilization ratio of the buffer decreases. For example, even when an inflowing traffic is small for one output port, since the allocated buffer areas have same sizes for all output ports, the buffer area allocated to the output port of small inflowing traffic has many wasted parts. Also, for an output port for which the inflowing traffic is greater than the outflowing traffic, or for an output port which is in a backpressure state, the number of cells waiting in buffer area increases, while the same size buffer is allocated to output ports whose amount of inflowing traffic is small. Therefore, even when many empty spaces are available in a shared buffer, cell loss may occur, and the method cannot be promptly adapted to traffic changes and external conditions change.

The dynamic partitioning method (S. Krishnan et al, Dynamic Partitioning: A Mechanism for Shared Memory Management, INFOCOM '99. Eighteenth Annual Joint Conference of the IEEE Computer and Communications Societies. Proceedings., Vol. 1, 1999) divides a load state into an overload state and an underload state based on the total number of cells waiting in a shared buffer, and makes a cell discard threshold of each virtual circuit has a different value in each state. In order to prevent a sudden change of the threshold due to a load state change, a threshold between each state is calculated by interpolation. When a new cell arrives, if the number of cells stored in a buffer area corresponding to a virtual circuit in which the cell is included is less than the threshold of the virtual circuit, and the total number of cells stored in the shared buffer is less than the size of the shared buffer, the new cell is stored in the shared buffer and otherwise the new cell is discarded.

The dynamic partitioning method uses interpolation to prevent a sudden change in a threshold, so the method needs complicated hardware for a plurality of multiplication and division, and high speed operation may be difficult. Since a cell discard threshold differs according to the service rate of each virtual circuit, a storage means is needed for storing an underload state and an overload state for each service rate. Also, since a cell discard threshold is determined only by the total number of cells, the method cannot be adapted to traffic changes and external environment changes.

SUMMARY OF THE INVENTION

To solve the above problems, it is an objective of the present invention to provide a buffer partitioning method capable of adaptively meeting traffic changes and external environmental changes, and a shared buffer switch which is used in the method.

To accomplish the objective of the present invention, there is provided a buffer partitioning method for a shared buffer switch which has a plurality of input ports, a plurality of output ports, and a shared buffer, the method for determining whether or not to store a cell, which is newly received through one of the input ports, in the shared buffer including the steps of (a) determining a buffer area of the shared buffer in which the newly received cell is stored; (b) determining a cell discard threshold with respect to the total number of cells stored in the shared buffer and the changing rate, with respect to time, of the total number of the cells; and (c) determining whether or not to store the newly received cell in the shared buffer, by comparing the number of cells stored in the buffer area in which the newly received cell is to be stored, with the cell discard threshold.

Also, to accomplish the first objective of the present invention, there is provided a shared buffer switch having a plurality of input ports for receiving cells from the outside; a shared buffer for storing the cells received through the plurality of input ports; a plurality of output ports for transmitting the cells stored in the shared buffer to the outside; and a partitioner which determines whether or not to store the cells, which are newly received through one of the input ports, in the shared buffer with respect to the total number of cells stored in the shared buffer and the changing rate, with respect to time, of the total number of the cells, and according to the determination, stores the newly received cells in the shared buffer, or discards the newly received cells.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
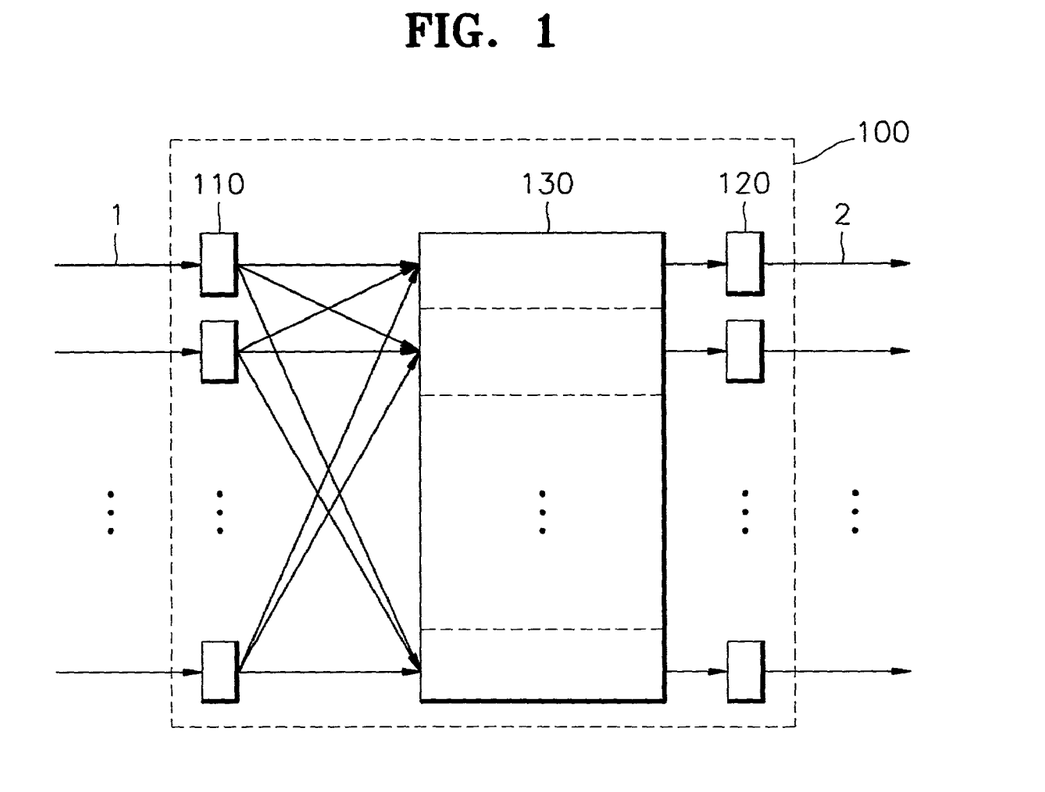
FIG. 1 is a schematic diagram of a shared buffer switch.

Referring to FIG. 1 which is a schematic diagram of a shared buffer switch, the shared buffer switch 100 includes a plurality of input ports 110, a plurality of output ports, and a shared buffer (or, memory) 130. Each of the ports 110 and 120 of the switch is linked to other nodes of a network. Each node receives a cell (or a packet) from a previous node and transfer the cell to a next node. A cell 1 which arrives at an input port 110 is switched according to the destination of the incoming cell, and is stored in an area of the shared buffer 130, the area corresponding to the destination. The incoming cell waits in the area before departing for a next node. The switch 100 reads a cell 2 from the shared buffer 130 for each output port 120 at each predetermined unit time, and transmits the cell to a next node.

In a network using packet switching, a Virtual Circuit (VC) can be formed by setting a group of nodes and links between a source and a destination of data. Each VC may have a predetermined service rate. Referring to FIG. 1, the switch 100 may be a shared node of a plurality of VCs. Therefore, the shared buffer 130 is partitioned for each output port or for each VC.

Since the size of the shared buffer 130 is limited, unless the areas of the shared buffer are partitioned appropriately for each output port or VC with respect to the traffic volume of inflowing cells and the operating environments, the performance of the switch 100 is degraded. That is, under the same hardware environments, the cell loss ratio and buffer utilization ratio will differ according to a shared buffer partitioning method.

Figure 2:
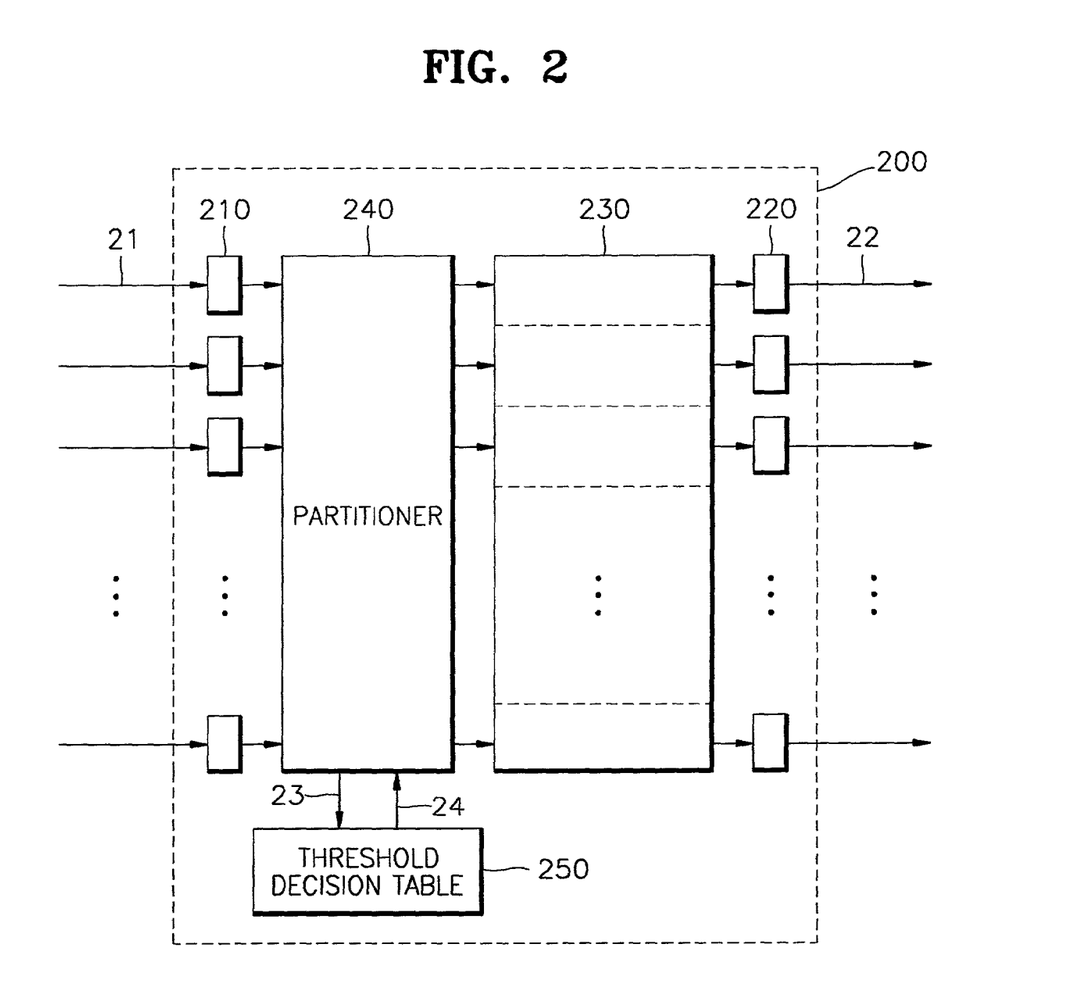
FIG. 2 is a block diagram of a preferred embodiment of a shared buffer switch according to the present invention.

FIG. 2 is a block diagram of a preferred embodiment of a shared buffer switch according to the present invention.

Referring to FIG. 2, the shared buffer switch 200 has a plurality of input ports 210, a shared buffer 230, a plurality of output ports 220, a partitioner 240, and a threshold decision table 250.

The input ports 210 receive arriving cells 21 from the outside.

The shared buffer 230 stores cells which are received through the plurality of input ports 210. The area of the shared buffer 230 is partitioned for each output port or VC by a buffer partitioning method according to the present invention. The partitioning is accomplished when the partitioner 240 stores cells in the shared buffer 230. A cell which arrives through one of the input ports 210, is switched according to the destination output port, or according to the VC which the cell belongs to, and then stored in a corresponding buffer area to wait.

The output ports 220 read cells 22 in the areas of the shared buffer, each area of which is allocated to each output port 220, according to a predetermined principle, and then transmit the read cells 22. For example, an output port 220 may read a cell in a corresponding buffer area according to a service rate which is determined for each VC. Sometimes, a service rate which is determined for each VC may not be considered. For example, when the area of the shared buffer 230 is partitioned for each output port, the service rate of each VC is not considered.

The partitioner 240 determines whether or not to store cells, which are input through the input ports 210, in the shared buffer 230 according to a predetermined principle, and then stores or discards the cells. A method for the determination will be explained later in detail.

The threshold decision table 250 is a memory for storing cell discard threshold values that are used in determining whether or not to store cells by the partitioner 240 in the shared buffer 230, or storing cell discard proportionality constants that are used in calculating the cell discard thresholds. If a combination of interval variables 23 is provided by the partitioner 240, using the combination, the threshold decision table 250 outputs a cell discard threshold or a cell discard proportionality constant 24 to the partitioner 240.

When a cell is stored in the shared buffer 230, the shared buffer 230 should have an available space, and otherwise the cell is not stored in the shared buffer 230 and discarded. The size of the available space of the shared buffer 230 is not determined by the total number of cells stored in the shared buffer 230, but defined as a value obtained by subtracting the number of cells which are currently stored in each buffer area from the cell discard threshold value of each buffer area.

Figure 3:
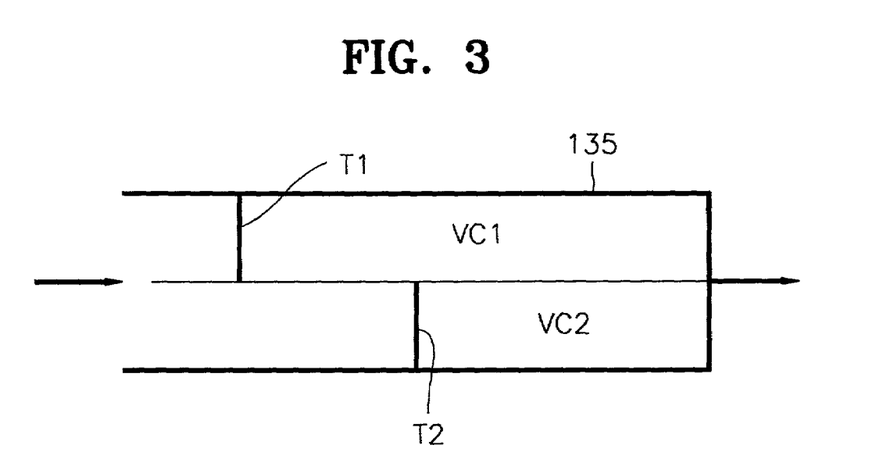
FIG. 3 is a schematic diagram of a buffer area of a shared buffer for explaining a cell discard threshold.

FIG. 3 is a schematic diagram of a buffer area of the shared buffer 230 for explaining a cell discard threshold. FIG. 3 shows a case where the shared buffer 230 is partitioned into two buffer areas corresponding to two virtual circuits, VC1 and VC2. Referring to FIG. 3, the cell discard threshold of a buffer area corresponding to VC1 is T1, while the cell discard threshold of a buffer area corresponding to VC2 is T2. For example, though no cells are waiting in the buffer area corresponding to VC1, if the number of cells stored in the buffer area corresponding to VC2 is the same as the cell discard threshold (T2) of the buffer area, a cell which is newly received and belongs to VC2 is not stored and is discarded.

When the shared buffer 230 is partitioned for each VC, the following principles are applied in determining the cell discard threshold of each buffer area.

Principle 1 is that cell loss due to discarding cells should be minimized, and principle 2 is that a VC which is in a condition where inflowing traffic suddenly increases or backpressure occurs should be able to obtain more buffer areas provided that other VCs can obtain normal buffer areas. Principle 3 is that partitioning of buffer areas for the VC which is in a state where inflowing traffic suddenly increases or backpressure occurs should not prevent other VCs obtaining normal buffer areas.

To satisfy the principles, in a buffer partitioning method according to the present invention, a cell discard threshold of each buffer area is determined using the total number of cells stored in the shared buffer 230 and the changing rate of the total number of cells with respect to time, so buffer areas are adaptively partitioned under an environment in which traffic and operating conditions are changing.

For adaptive buffer partitioning, two methods for determining a cell discard threshold are provided: a method of directly determining a cell discard threshold and a method of determining a cell discard threshold by setting a proportionality constant.

The method of directly determining a cell discard threshold, the first one of the buffer partitioning method according to the present invention will now be explained in detail.

First, let B be the size of the entire shared buffer 230, that is, the number of maximum cells that can be stored in the shared buffer 230. If B is divided into n intervals, $b_1, b_2, \ldots, b_n$, the total number Q(t) of cells which are stored in the shared buffer 230 at time t is included in one of the n intervals. Here, n is an arbitrary positive integer and the size of each interval may be arbitrarily determined.

Also, let D(t) be the change rate of Q(t) with respect to time. If values that D(t) can have are divided into k intervals, $d_1, d_2, \ldots, d_k$, D(t) belongs to one of $d_1, d_2, \ldots, d_k$. Here, k is an arbitrary positive integer and the size of each interval may be arbitrarily determined. Unlike Q(t), D(t) can be a negative value. Also, D(t) may be determined as a differential value of Q for time period T such as Q(t)−Q(t−T), or as a derivative value of Q for time period T such as {Q(t)−Q(t−T)}/T. When the switch 200 has N input ports 210, D(t) which is defined as a differential value is a value between −NT and +NT, and D(t) which is defined as a derivative value is a value between −N and +N.

If values which service rates of VCs can be are divided into m intervals, $S_1, S_2, \ldots, S_m$, the service rate of a VC to which a cell belongs is included in one of $S_1, S_2, \ldots, S_m$. Here, m is an arbitrary positive integer, and the size of each interval may be arbitrarily determined. A service rate may be a value between 0 and the maximum bandwidth of the input port 210.

A cell discard threshold is determined for each combination of an interval in which a service rate is included, an interval in which Q(t) is included, and an interval in which D(t) is included. The cell discard threshold may be determined by an equation. Also, the cell discard threshold may be calculated in advance and stored in the threshold decision table 250 so that the threshold can be referred to later when necessary.

First, if Q(t) is big, a cell discard threshold should be relatively smaller than that of a case where Q(t) is small, according to principle 3. If Q(t) is small, a cell discard threshold which is relatively bigger than that of a case where Q(t) is big can be used according to principle 2.

Next, when the number of cells continuously decreases though Q(t) is big, that is, when D(t) is a negative value, Q(t) will become small after a some time period. Therefore, in this case, a cell discard threshold relatively bigger than that of a case where Q(t) is big and D(t) is a positive value, can be used. That is, when D(t) is small, a cell discard threshold which is relatively big can be used. Also, when Q(t) is small, a cell discard threshold may be differently determined depending on D(t). Thus, if a cell discard threshold is determined in consideration of D(t), the changing rate of the total number of cells with respect to time, changes of the number of cells can be predicted, so this method provides better performance than the prior art method which determines a cell discard threshold just using the number of cells.

Figure 4:
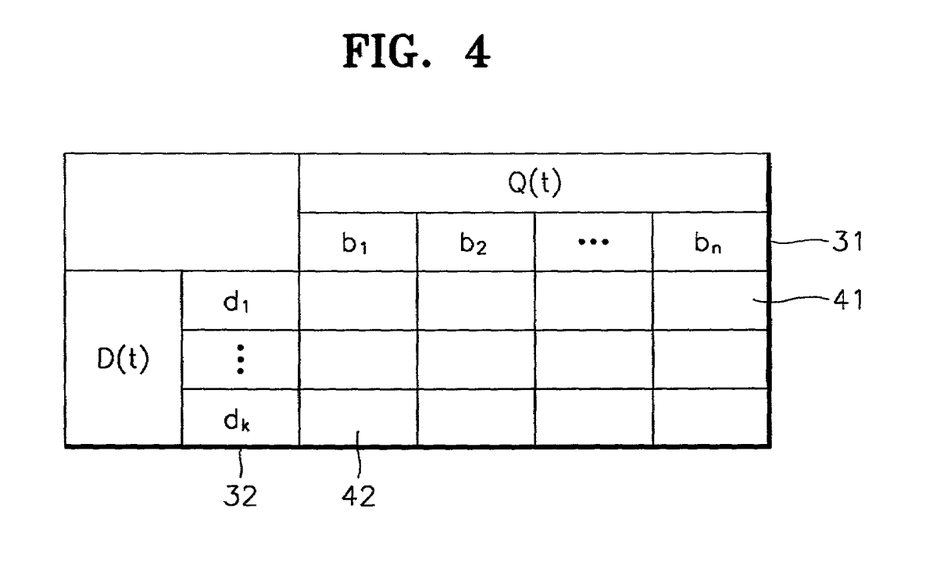
FIG. 4 is a schematic diagram of a preferred embodiment of a threshold decision table which is used in a buffer partitioning method according to the present invention.

FIG. 4 is a schematic diagram of a preferred embodiment of a threshold decision table which is used in a buffer partitioning method according to the present invention. Referring to FIG. 4, when the service rate of each VC is not considered, a cell discard threshold is stored for each combination of an interval 31 in which Q(t) is included and an interval 32 in which D(t) is included. For example, when a new cell is input through one of the input ports 210 at time t, if the total number of cells stored in the shared buffer 230, Q(t), is included in interval $b_n$, and the changing rate, with respect to time, of the total number of cells, D(t), is included in interval $d_1$, a value stored in 41 of FIG. 4 is a cell discard value for determining whether or not to discard the newly received cell.

In the above description, the reason for dividing the service rates, Q(t), and D(t) into m intervals, n intervals, and k intervals, respectively, is that if cell discards thresholds for all services rates, Q(t)'s, and D(t)'s are stored, the size of the threshold decision table 250 is too big. The number of intervals has to be proper. If the number of intervals is too small, the change of a cell discard threshold between intervals becomes too big.

In the dynamic partitioning method, when the number of intervals is small, interpolation is used to prevent sudden changes in the cell discard threshold, which needs complicated hardware configuration for a large number of multiplications and divisions. The buffer partitioning method according to the present invention appropriately adjusts the number of intervals so that sudden changes in the cell discard threshold can be prevented and hardware implementation can be relatively easier. If the maximum values of the service rate of each VC, and Q(t) or D(t) are very small, the size of an interval may be '1' such that cell discard thresholds are stored for all service rates, all Q(t)'s, and all D(t)'s.

Figure 5:
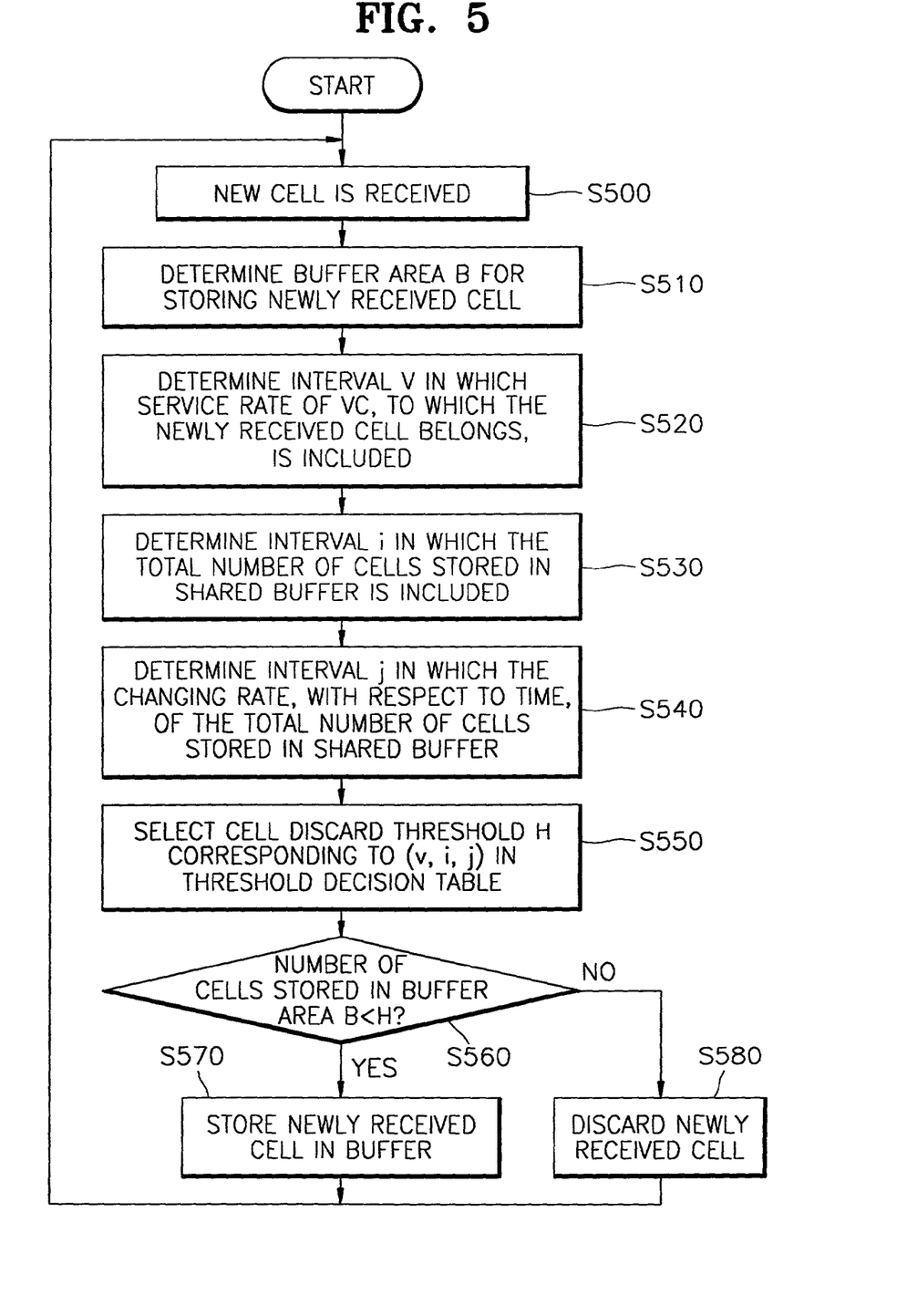
FIG. 5 is a flowchart of the steps of a buffer partitioning method according to the present invention in which a cell discard threshold is directly determined.

FIG. 5 is a flowchart of the steps of a buffer partitioning method according to the present invention in which a cell discard threshold is directly determined.

If a new cell is received through one of the input ports 210 in step S500, the partitioner 240 determines buffer area B in which the newly received cell is stored in step S510. Buffer areas may be divided for each output port 220, or for each VC.

The partitioner 240 determines interval v in which the service rate of a VC to which the newly received cell belongs, is included in step S520, determines interval i in which the total number of cells stored in the shared buffer 230 is included in step S530, and determines interval j in which the changing rate, with respect to time, of the total number of cells stored in the shared buffer is included in step S540. If the service rate is not considered as when the buffer areas are partitioned for each output port 220, step S520 may be omitted.

After interval v, i, and j are determined, cell discard threshold H is determined by referring to a value corresponding to interval (v, i, j) from threshold decision table 250 in step S550. The threshold decision table 250 may store a cell discard threshold corresponding to each interval (v, i, j), or if the service rate is not considered, may store a cell discard threshold corresponding to each interval (i, j) without consideration of interval v.

The number of cells stored in buffer area B and cell discard threshold H which is determined in step S550 are compared in step S560. If H is bigger, the newly received cell is stored in buffer area B in step S570, and if H is smaller, the newly received cell is discarded in step S580.

After shared buffer partitioning for one cell is finished, shared buffer partitioning for next new cell is performed from step S500.

Thus, the method for directly determining a cell discard threshold of the buffer partitioning method according to the present invention is explained. The method for determining a cell discard threshold by setting a proportionality constant of the buffer partitioning method according to the present invention will now be explained in detail.

With the shared buffer switch 200 that operates as the common nodes of a plurality of VCs, a method for optimally partitioning a finite shared buffer 230 is to partition the shared buffer in proportion to the service rate of each VC. That is, allocating the bandwidth of input ports 210 and output ports 220 and the areas of the shared buffer 230, with respect to a portion that the service rate of each VC takes in the entire bandwidth that the switch 200 is currently using, is the fairest method. If the number of currently used VCs is S, h-th VC is $VC_h$, the size of the entire shared buffer is B, and the service rate of $VC_h$ is $r_h$, then the size of the buffer area optimally allocated for $VC_h$ is as the following formula:

$$B \times \frac{r_h}{\sum_{j=1}^{S} r_j} \quad (1)$$

However, sometimes a VC may have no cells for a while, or may have an inflowing traffic volume less than an expected inflowing traffic volume according to a predetermined service rate. That is, sometimes the utilization ratio of the shared buffer 230 may be lower than expected. In order to raise the buffer utilization ratio and reduce the cell discard ratio, when the total number of cells currently waiting in the shared buffer 230 is small, a buffer area bigger than the optimal value obtained by formula 1 may be allocated for each VC. That is, by setting cell discard proportionality constant Y which is equal to or greater than 1, a buffer area of which size is obtained by the following formula 2 can be allocated to $VC_h$:

$$Y \times B \times \frac{r_h}{\sum_{j=1}^{S} r_j} \quad (2)$$

After taking a value obtained by formula 2 as a cell discard threshold, it can be determined whether or not to store a newly received cell, by comparing the number of cells stored in a buffer area in which the newly received cell is to be stored, with the cell discard threshold of formula 2.

When cell discard proportionality constant Y is set, the total number Q(t) of cells stored in the shared buffer and the changing rate D(t) are considered as in direct determining method of a cell discard threshold, so the shared buffer can be adaptively partitioned even in traffic change and backpressure. Also, proportional constant Y may be set for each interval of Q(t) and D(t).

For example, if Q(t) is big and D(t) is a positive number, it means that the shared buffer 230 does not have enough space, and therefore proportionality constant Y is set as 1. If Q(t) is big but D(t) is a negative number, the shared buffer 230 begins to have enough space, and therefore proportionality constant Y can be set as Y>1.

For cell discard proportionality constant Y, a threshold decision table as in FIG. 4 can be set so that, when a new cell belonging to $VC_h$ is received, a value, corresponding to an interval in which the total number Q(t) of cells stored in the shared buffer 230 is included and an interval in which the changing rate D(t), with respect to time, of the total number of cells is included, can be referred to. For example, if Q(t) is included in interval $b_1$ and D(t) is included in interval $d_k$, the value stored in 42 of FIG. 4 becomes cell discard proportionality constant Y.

If we call a value obtained by formula 1 a reference cell discard threshold, a value obtained by formula 2 is a value obtained by multiplying cell discard proportionality constant Y by the reference cell discard threshold. Therefore, after a reference cell discard threshold is calculated, a cell discard proportionality constant is determined, and then a cell discard threshold is obtained by multiplying two values.

Figure 6:
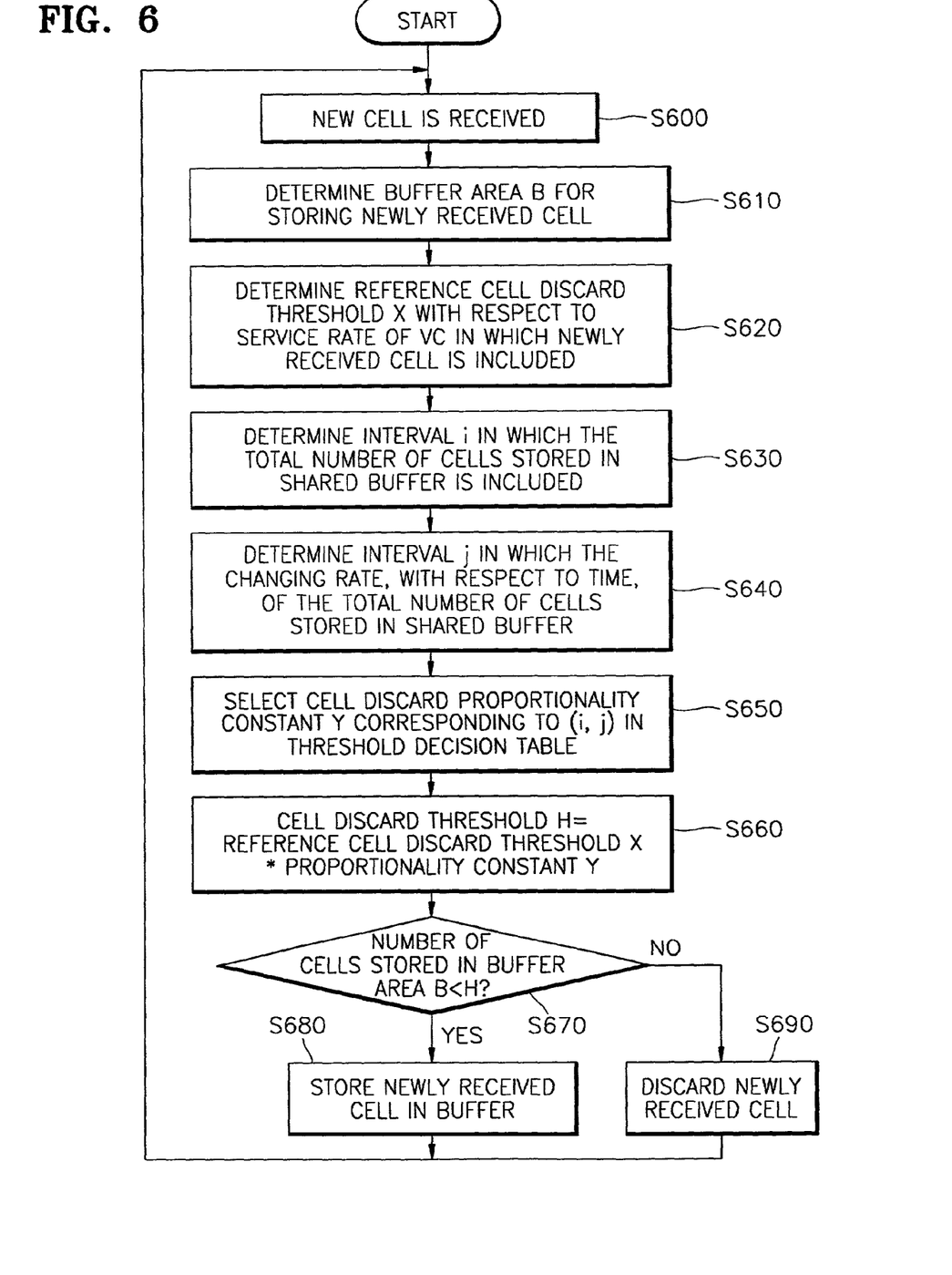
FIG. 6 is a flowchart of the steps of a buffer partitioning method according to the present invention in which a cell discard threshold is determined by setting a proportionality constant.

FIG. 6 is a flowchart of the steps of a buffer partitioning method according to the present invention in which a cell discard threshold is determined by setting a proportionality constant. Referring to FIG. 6, the steps of the method for determining a cell discard threshold by setting a proportionality constant will now be explained in detail.

If a new cell 21 is received through one of the input ports 210 in step S600, the partitioner 240 determines buffer area B in which the newly received cell is to be stored in step S610. Buffer areas are partitioned for each VC.

The partitioner 240 calculates reference cell discard threshold X according to formula 1 using the service rate of a VC to which the newly received cell belongs in step S620.

Also, the partitioner 240 determines interval i in which the total number of cells stored in the shared buffer 230 is included in step S630, and determines interval j in which the changing rate, with respect to time, of the total number of cells stored in the shared buffer 230 is included in step S640.

After determining intervals i and j, cell discard proportionality constant Y is determined referring to a value corresponding to interval (i, j) from the threshold decision table 250 in step S650.

Then, cell discard threshold H is calculated by multiplying reference cell discard threshold X by cell discard proportionality constant Y in step S660.

The number of cells stored in buffer area B is compared with cell discard threshold H determined in step S660, in step S670. If H is bigger, the newly received cell is stored in buffer area B in step S680, and if H is smaller, the newly received cell is discarded in step S690.

After shared buffer partitioning for one cell is finished, steps from S600 are performed again for next received cell.

The method for determining a cell discard threshold by setting a proportionality constant needs only a threshold decision table 250 for the proportionality constant, so the amount of a needed memory is smaller.

The present invention may be embodied in a code, which can be read by a computer, on a computer readable recording medium. The computer readable recording medium includes all kinds of recording apparatuses on which computer readable data are stored. The computer readable recording media includes storage media such as magnetic storage media (e.g., ROM's, floppy disks, hard disks, etc.), optically readable media (e.g., CD-ROMs, DVDs, etc.) and carrier waves (e.g., transmissions over the Internet).

So far, optimum embodiments are explained in the drawings and specification, and though specific terminologies are used here, those were only to explain the present invention. Therefore, the present invention is not restricted to the above-described embodiments and many variations are possible within the spirit and scope of the present invention. The scope of the present invention is not determined by the description but by the accompanying claims.

According to the buffer partitioning method for a shared buffer switch according to the present invention, using a cell discard threshold which is determined with respect to the total number of cells stored in a shared buffer and the changing rate of the total number of cells, it is determined whether or not to store a newly received cell. Therefore, the shared buffer switch adaptively handles changes in inflowing traffic volume and changes in outflowing cell traffic volume such that cell loss due to cell discard is effectively prevented.

Also, by setting a proportionality constant so as to determine a cell discard threshold value, implementation of hardware becomes easier and the amount of needed memory becomes smaller.

What is claimed is:

1. A buffer partitioning method for a shared buffer switch which has a plurality of input ports, a plurality of output ports, and a shared buffer, the method for determining whether or not to store a cell, which is newly received through one of the input ports, in the shared buffer comprising the steps of:
   (a) determining a buffer area of the shared buffer in which the newly received cell is stored;
   (b) determining a cell discard threshold with respect to the total number of cells stored in the shared buffer and the changing rate, with respect to time, of the total number of the cells; and
   (c) determining whether or not to store the newly received cell in the shared buffer, by comparing the number of cells stored in the buffer area in which the newly received cell is to be stored, with the cell discard threshold.

2. The method of claim 1, wherein the shared buffer switch has a table for storing cell discard thresholds with respect to the total number of cells stored in the shared buffer and the changing rate, with respect to time, of the total number of the cells, and in step (b) a cell discard threshold is determined by referring to a cell discard threshold corresponding to the total number of cells stored in the shared buffer and the changing rate, with respect to time, of the total number of the cells in the table.

3. The method of claim 1, wherein in step (b) interval i in which the total number of cells stored in the shared buffer is determined after dividing the maximum number of cells that can be stored in the shared buffer into a plurality of intervals, and a cell discard threshold is determined with respect to interval i and the changing rate, with respect time, of the total number of the cells.

4. The method of claim 1, wherein in step (b) interval j in which the changing rate, with respect to time, of the total number of the cells is determined after dividing a range of the changing rate, with respect to time, of the total number of the cells stored in the shared buffer into a plurality of intervals, and a cell discard threshold is determined with respect to the total number of cells stored in the shared buffer and interval j.

5. The method of claim 1, wherein in step (b) interval i in which the total number of cells stored in the shared buffer is determined after dividing the maximum number of cells that can be stored in the shared buffer into a plurality of intervals; interval j in which the changing rate, with respect to time, of the total number of the cells is determined after dividing a range of the changing rates, with respect to time, of the total number of the cells stored in the shared buffer into a plurality of intervals; and then a cell discard threshold is determined with respect to interval i and interval j.

6. The method of claim 1, wherein the shard buffer switch is a common node of a plurality of Virtual Circuits (VCs), and in step (a) a buffer area for storing a newly received cell is determined according to a VC in which the newly received cell is included.

7. The method of claim 6, wherein each VC has a predetermined service rate, and in step (b) a cell discard threshold is determined with respect to the service rate of a VC in which the newly received cell is included, the total number of cells stored in the shared buffer, and the changing rate, with respect to time, of the total number of cells.

8. The method of claim 7, wherein the shared buffer switch has a table for storing a cell discard threshold corresponding to the service rate of a VC in which each cell is included, the total number of cells stored in the shared buffer, and the changing rate, with respect to time, of the total number of cells, and in step (b) a cell discard threshold is determined by referring to a cell discard threshold corresponding to the service rate of a VC in which the newly received cell is included, the total number of cells stored in the shared buffer, and the changing rate, with respect to time, of the total number of cells.

9. The method of claim 7, wherein in step (b) interval v in which the service rate of a VC to which the newly received cell belongs is included is determined after dividing a range of the service rates of the VCs; interval i in which the total number of cells stored in the shared buffer is determined after dividing the maximum number of cells that can be stored in the shared buffer into a plurality of intervals; interval j in which the changing rate, with respect to time, of the total number of the cells is determined after dividing a range of the changing rates, with respect to time, of the total number of the cells stored in the shared buffer into a plurality of intervals; and then a cell discard threshold is determined with respect to intervals v, i andj.

10. A buffer partitioning method for a shared buffer switch which has a plurality of input ports, a plurality of output ports, and a shared buffer, and operates as a common node of a plurality of Virtual Circuits (VCs) having different predetermined service rates, the method for determining whether or not to store a cell, which is newly received through one of the input ports, in the shared buffer comprising the steps of:
   (a) determining a buffer area of the shared buffer, in which the newly received cell is stored, according to a VC to which the newly received cell belongs;
   (b) determining a reference cell discard threshold with respect to the service rate of the VC to which the newly received cell belongs;
   (c) determining a cell discard proportionality constant with respect to the total number of cells stored in the shared buffer and the changing rate, with respect to time, of the total number of the cells;
   (d) determining a cell discard threshold by multiplying the reference cell discard threshold by the cell discard proportionality constant; and
   (e) determining whether or not to store the newly received cell in the shared buffer, by comparing the number of cells stored in the buffer area in which the newly received cell is to be stored, with the cell discard threshold.

11. The method of claim 10, wherein the shared buffer switch has a table for storing cell discard proportionality constants with respect to the total number of cells stored in the shared buffer and the changing rate, with respect to time, of the total number of the cells, and in step (c) a cell discard proportionality constant is determined by referring to a cell discard proportionality constant corresponding to the total number of cells stored in the shared buffer and the changing rate, with respect to time, of the total number of the cells in the table.

12. The method of claim 10, wherein in step (c) interval i in which the total number of cells stored in the shared buffer is determined after dividing the maximum number of cells that can be stored in the shared buffer into a plurality of intervals, and a cell discard proportionality constant is determined with respect to interval i and the changing rate, with respect time, of the total number of the cells.

13. The method of claim 10, wherein in step (c) interval j in which the changing rate, with respect to time, of the total number of the cells is determined after dividing a range of the changing rate, with respect to time, of the total number of the cells stored in the shared buffer into a plurality of intervals, and a cell discard proportionality constant is determined with respect to the total number of cells stored in the shared buffer and interval j.

14. The method of claim 10, wherein in step (c) interval i in which the total number of cells stored in the shared buffer is determined after dividing the maximum number of cells that can be stored in the shared buffer into a plurality of intervals; interval j in which the changing rate, with respect to time, of the total number of the cells is determined after dividing a range of the changing rates, with respect to time, of the total number of the cells stored in the shared buffer into a plurality of intervals; and then a cell discard proportionality constant is determined with respect to interval i and interval j.

15. A shared buffer switch comprising:
a plurality of input ports for receiving cells from the outside;
a shared buffer for storing the cells received through the plurality of input ports;
a plurality of output ports for transmitting the cells stored in the shared buffer to the outside; and
a partitioner which determines whether or not to store the cells, which are newly received through one of the input ports, in the shared buffer with respect to the total number of cells stored in the shared buffer and the changing rate, with respect to time, of the total number of the cells, and according to the determination, stores the newly received cells in the shared buffer, or discard the newly received cells.

16. The shared buffer switch of claim 1, further comprising:
a table for storing cell discard thresholds with respect to the total number of cells stored in the shared buffer and the changing rate, with respect to time, of the total number of the cells.

17. The shared buffer switch of claim 15, wherein the shared buffer switch is a common node of a plurality of Virtual Circuits (VCs) having different predetermined service rates, and has a table for storing cell discard thresholds with respect to the service rate of a VC to which each cell belongs, the total number of cells stored in the shared buffer and the changing rate, with respect to time, of the total number of the cells.

18. The shared buffer switch of claim 15, wherein the shared buffer switch is a common node of a plurality of Virtual Circuits (VCs) having different predetermined service rates, and has a table for storing cell discard proportionality constants with respect to the total number of cells stored in the shared buffer and the changing rate, with respect to time, of the total number of the cells.

* * * * *